US008095672B1

(12) United States Patent
Newstadt et al.

(10) Patent No.: US 8,095,672 B1
(45) Date of Patent: Jan. 10, 2012

(54) VERIFYING ONLINE IDENTITIES ACROSS PARENTAL CONTROL SYSTEMS

(75) Inventors: Keith Newstadt, Newton, MA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 232 days.

(21) Appl. No.: 12/324,762

(22) Filed: Nov. 26, 2008

(51) Int. Cl.
*G06F 15/16* (2006.01)

(52) U.S. Cl. ........ 709/229; 709/225; 709/206; 709/207; 726/4; 726/27; 705/75

(58) Field of Classification Search .......... 709/206–207, 709/224; 726/1, 27–28; 715/745
See application file for complete search history.

(56) References Cited

U.S. PATENT DOCUMENTS

| 7,452,278 | B2 | 11/2008 | Chen et al. |
| 7,904,554 | B1* | 3/2011 | Lu et al. ........................ 709/224 |
| 2002/0049806 | A1* | 4/2002 | Gatz et al. ..................... 709/203 |
| 2003/0046097 | A1 | 3/2003 | LaSalle et al. |
| 2004/0199582 | A1 | 10/2004 | Kucharewski et al. |
| 2004/0205127 | A1 | 10/2004 | Ben-Yoseph |
| 2006/0036701 | A1 | 2/2006 | Bulfer et al. |
| 2006/0173792 | A1 | 8/2006 | Glass |
| 2006/0242306 | A1 | 10/2006 | Boro et al. |
| 2008/0005325 | A1* | 1/2008 | Wynn et al. .................... 709/225 |
| 2008/0162692 | A1* | 7/2008 | Schultz et al. ................ 709/224 |
| 2009/0077023 | A1* | 3/2009 | Myers et al. ...................... 707/3 |
| 2009/0217342 | A1* | 8/2009 | Nadler .............................. 726/1 |

OTHER PUBLICATIONS

Official Action received from USPTO dated Dec. 22, 2009 for U.S. Appl. No. 12/130,820, filed May 30, 2008.
Official Action received from USPTO dated Jan. 27, 2011 for U.S. Appl. No. 12/118,621, filed May 9, 2008.

* cited by examiner

*Primary Examiner* — Abdullahi Salad
(74) *Attorney, Agent, or Firm* — Brill Law Office; Jeffrey Brill

(57) ABSTRACT

Identities of owners of electronic communication aliases are collected from a plurality of client computers across a parental control system. Each collected identity corresponds to an electronic communication aliases used by at least one child associated with the originating client computer. The collected identities and the corresponding electronic communication aliases are stored. Response to receiving a collected identity, previously stored identities corresponding to the same electronic communication alias are retrieved, and compared to the received identity. The more previously stored identities match the received identity, the more likely the received identity is to be accurate. Therefore, based upon the comparison results, it can be determined whether the received identity is accurate or not. If it is determined that the received identity is false, the relevant parents are automatically notified.

18 Claims, 2 Drawing Sheets

VERIFYING ONLINE IDENTITIES ACROSS PARENTAL CONTROL SYSTEMS

RELATED APPLICATIONS

This application is related to patent application Ser. No. 12/118,621 titled "Verifying Instant Messaging Aliases via Online Parental Control Accounts," filed on May 9, 2008 and having the same assignee (the "First Parental Verification Application"). This application is also related to patent application Ser. No. 12/130,820 titled "Verifying Instant Messaging Aliases via Online Parental Control Accounts, without Disclosing Identity to Unverified Parties," filed on May 30, 2008 and having the same assignee (the "Second Parental Verification Application").

TECHNICAL FIELD

This invention pertains generally to instant messaging and online chatting, and more specifically to enabling parents to verify the identity of their children's instant messaging, voice and/or video chat friends based on their aliases.

BACKGROUND

Instant messaging ("IM") between children is very popular today. Although IM can be a great vehicle for children to establish and maintain friendships, it also puts children at risk for exposure to bad influences and even electronic predators. Because the communication is electronic in nature, it is easy for people to pretend to be who they are not, and very hard for parents to keep track of with whom their children are communicating. Other communications mechanisms such as voice and video chat present similar issues.

Online-based parental control systems exist today. A key aspect of online parental control is the ability for parents to control with whom a child communicates online. Such systems enable parents to require that children receive permission to add friends to the list of parties with whom they can communicate. Unfortunately, even with such systems, the only mechanism parents have for actually determining the true identities of their child's online buddies is to ask their child. The response of children is not reliable in this context, as children can be dishonest or themselves the victims of other's dishonesty. Without being able to determine with whom their children are really requesting permission to communicate, the power to approve or deny the requests is not sufficient.

The related First Parental Verification Application discloses methodology according to which an online-based parental control system is used to verify the identity of children and their parents, based on children's instant messaging aliases. This way, a child's instant messaging buddies can be limited to children whose parents have been securely identified. More specifically, the online-based parental control system maintains a plurality of verified parental accounts, each of which includes the identity of the parents and their children, including the children's instant messaging aliases. When a first child wishes to electronically communicate with a second child, the first child makes a request which includes the second child's instant messaging alias. The system searches the plurality of parental accounts for one containing the second child's alias. If the alias is not found, instant messaging between the children is not allowed. If a parental account containing the alias is found, an identity verification request is transmitted to the parents of the second child. The identity verification request discloses the identity of the first child's parents, and requests reciprocal verification of the identity of the parents of the second child. Only if the second child's parents respond by disclosing their identity is the instant messaging between the children permitted.

The subject matter of the First Parental Verification Application represents a big step forward in the provision of security in the IM context. However, in the methodology disclosed therein, the first child's parents need to disclose their own identify to the second child's parents, before the identity of the second child's parents has been confirmed. The related Second Parental Verification Application discloses methodology according to which an online-based parental control system is used to verify the identity of children and their parents, based on children's instant messaging aliases, in such a way that neither parent has to disclose their identity to an unknown party.

More specifically, when a first child wishes to electronically communicate with a second child, the first child makes a request which includes not only the second child's instant messaging alias, but also additional information identifying the second child's parents. The online-based parental control system searches the plurality of parental accounts for one containing the second child's alias. If the alias is not found, instant messaging between the children is not allowed. If a parental account containing the alias is found, the system attempts to verify the additional information provided in the request. If this information cannot be verified, instant messaging between the children is not allowed. Only if the additional information can be confirmed is an identity verification request transmitted to the parents of the second child.

The subject matter of the Second Parental Verification Application represents another step forward in the provision of security in the IM context. However, in the methodology disclosed therein, a parent still needs to take a proactive step in order to initiate a workflow to verify an identity behind an online alias. It would be desirable to eliminate that shortcoming.

SUMMARY

Identities of owners of electronic communication aliases are collected from a plurality of client computers across a parental control system. Each collected identity corresponds to an electronic communication aliases used by at least one child associated with the originating client computer. The collected identities and the corresponding electronic communication aliases are stored. Response to receiving a collected identity, previously stored identities corresponding to the same electronic communication alias are retrieved, and compared to the received identity. The more previously stored identities match the received identity, the more likely the received identity is to be accurate. Therefore, based upon the comparison results, it can be determined whether the received identity is accurate or not. If it is determined that the received identity is false, the relevant parents are automatically notified.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
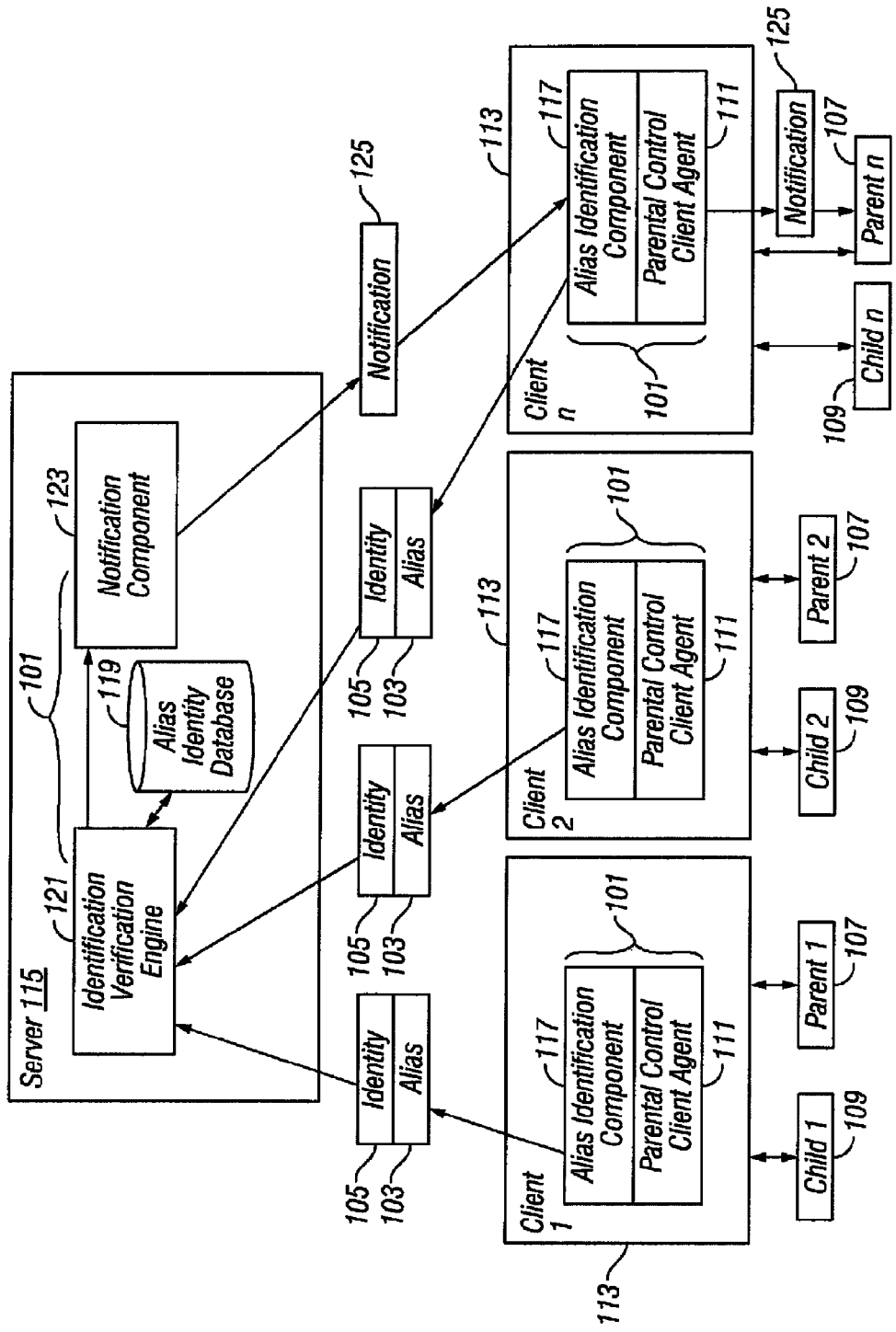
FIG. 1 is a block diagram illustrating a system for verifying the identity of online aliases, according to some embodiments of the present invention.

FIG. 1 illustrates a system for verifying the identity 105 of online aliases 103, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, aspects of the present invention are built on top of an online-based parental control system 101. Such a 101 system provides both parental control enforcement at the user computer 113 level, parental control management via the Web, and workflow management to allow children 109 to request permission to communicate with specific online (e.g., IM or voice/video chat) aliases 103.

As noted above, IM has become a primary communication mechanism for kids 109 today. Most children 109 add everyone they communicate with, even casually, to their buddy list. Over time this will also extend to voice and video chat, as well as to more immersive online environments such as Second Life®. Because of the prevalence of this type of electronic communication, any given parental control application 101 that has even moderate market share has an opportunity to collect reported identities 105 associated with particular online aliases 103 from many different children 109.

Where many children 109 use the same identity 105 for a given alias 103, it is likely that identity 105 is accurate. On the other hand, if an individual child 109 uses an identity 105 for an alias 103 that differs from that reported by other children 109 for the same alias 103, it could well be false. Thus, by comparing a reported identity 105 for an alias 103 to the previously reported identities 105 for the same alias 103, the likelihood that a given reported identity 105 is accurate can be determined. This makes it possible to spot a child 109 who misrepresents the identity 105 of the owner of a given alias 103.

As illustrated, a parental control client agent 111 runs on each of a plurality of client computers 113 utilizing the parental control system 101. Although only three client computers 113 running parental control client agents 111 appear in FIG. 1 for the sake of simplicity of illustration, it is to be understood that typically a much larger number would be deployed in practice. Each parental control client agent 111 is responsible for client side processing of parental control system 101 related activities, including gathering information concerning the online aliases 103 with which a child 109 (or multiple children 109) using that computer 113 communicate(s). The parental control client agent 111 interfaces with the alias identification component 117, to glean the identities 105 behind aliases 103, as described below.

The alias identification component 117 collects the identities 105 behind aliases 103 with which a given child 109 communicates. The alias identification component 117 can collect this information directly from a child's 109 buddy list, by monitoring IM and other relevant network traffic to and from the child's 109 computer 113, by detecting workflow requests from the child 109 asking his parents 107 for permission to communicate with a given alias 103, and/or simply by allowing the child 103 to manually enter the relevant information. The alias identification component 117 can reside on the server 115, accessible from a Web browser, or it can reside on the client 113, reporting the collected information to relevant components running on the server 115, as illustrated. Either way, the alias identification component 117 sends the collected aliases 103 and identities 105 to a centralized identity verification engine 121. In addition, such information can but need not be stored locally on the client 113.

The identity verification engine 121 receives identities 105 gleaned by the alias identification component(s) 117, and determines whether the received identities 105 are accurate. To do so, when the identity verification engine 121 receives a reported identity 105 for a given alias 103, it compares that reported identity 105 to all identities 105 previously reported for the same alias 103. More specifically, the identity verification engine 121 retrieves all the identities 105 for that alias 103 that have been previously reported from the various parties using the parental control system 101, and checks the currently received identity 105 against each of them for a match. Because a large number of users are reporting gleaned identities 105 for a large number of aliases 103, it should often be the case that the identity verification engine 121 has access to a large sampling of previously reported identities 105 for a given alias 103 to which to compare the current identity 105. Typically, the data is normalized for the comparison process, to account for short name forms (e.g., Jon for Jonathan, etc.), misspellings, and the like.

For each match, the likelihood that both the current identity 105 and the matching previously reported identity 105 are accurate increases. For this reason, the identity verification engine 121 increases an associated validation score. It is to be understood that the format to use for the instantiation of the validation score is a variable design parameter. For each mismatch between the current identity 105 and a previously reported identity 105 for the same alias 103, the validation score is decreased. If the validation score drops below a set threshold, the identity verification engine 121 adjudicates that the current identity 105 is not accurate (and thus any previously reported identities 105 that match it are also false). In response to so determining, the relevant parent(s) 107 are notified, as described below. In any case, the identity verification engine 121 stores the currently received identity 105 in the alias identity database 119, thereby adding it to the set of received identities 105.

It is to be understood that the threshold to use in determining whether a given identity 105 is accurate is a variable design parameter, that can be set by, for example, an administrator, a parent 107, the publisher of the parent control system 101, etc. In some embodiments the threshold can be adjusted up or down as desired, depending upon the level of sensitivity desired in detecting potentially false identities 105.

Reported identities 105 are stored in an alias identity database 119 (or other suitable storage mechanism), for later retrieval. For each reported identity 105, the database 119 typically stores the alias 103 handle, the service (e.g. YIM, Skype) that the alias 103 resides on, any identifying information about the owner of the alias 103 (such as name, address, etc.), and a reference back to the parent 107 of the child 109 with which the reporting of the identity 105 originated. The identity 105 can simply comprise the first and last name of the owner of the alias 103, but can also include other identifying information such as email address, phone number, high school attended, etc.

Where the relevant functionalities are executed on the server 115, the association between alias 103 and identity 105 can be stored in a common server side database 119. Where the identity 105 is collected and/or stored at the client 113, gleaned identities 105 are reported to the server 115 for processing and storage, in addition to any local storage activity at the client 113.

As explained above, once the validation score for a current or previously reported identity 105 falls below the threshold, the identity 105 is considered to be false. When a reported identity 105 is determined to be false, a notification component 123 informs the appropriate parent(s) 107. The notification 125 can take the form of an event in the parental control system 101, an email, an IM, a facsimile, an automated phone call, etc. The notification 125 typically includes the alias 103, the contents of the false identity 105 (name, address, school, etc.), and the child 109 from whom the false identity 105 originated. The notification component can notify just the parent 107 of the originating child 109 for the current identity 105 adjudicated to be false, or the parents 109 of all children 103 from whom that identity 105 has originated at any time. Notifications 125 can be triggered by determining that a reported identity 105 is false and/or by attempts by children to report or otherwise use known false identities 105. In any case, the true identity 105 is typically not reported to the parent(s) 107, to protect the privacy of the alias's 103 owner.

In some embodiments, parents 107 may also view validation analysis data for each alias 103 with which their children 109 communicates, either through a parental control system 101 user interface, or via a password protected web site, etc. This allows a parent 107 to get a sense of whether an identity 105 is likely to be accurate, simply not known to be false, likely to be false, etc. Parents 107 can view validation level analysis data at any level of granularity: e.g., sense of certainty level, whether enough data to make a determination, etc.

Figure 2:
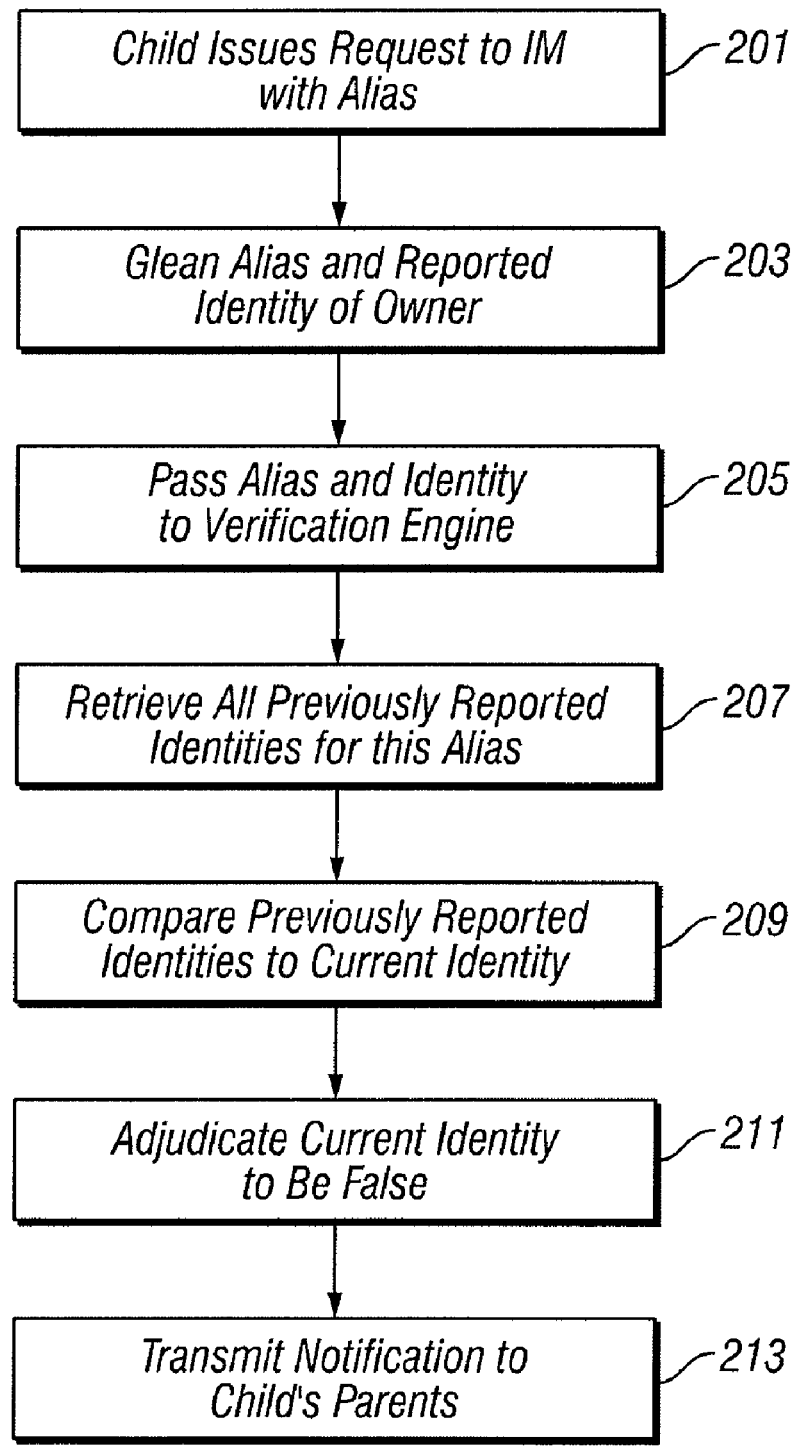
FIG. 2 is a flowchart illustrating steps for verifying the identity of online aliases, according to some embodiments of the present invention.

FIG. 2 illustrates steps for detecting the use of a false identity 105 (FIG. 1) by a child 109 (FIG. 1), and the subsequent notification of the child's 109 (FIG. 1) parents 107 (FIG. 1), according to one embodiment of the present invention. As illustrated in FIG. 2, a child 109 (FIG. 1) issues 201 a request to his parents 107 (FIG. 1) to exchange IMs with a given alias 103 (FIG. 1). The request includes the alias 103 (FIG. 1) and what the child 109 (FIG. 1) claims is the identity 105 (FIG. 1) of its owner. This alias 103 (FIG. 1) and associated identity 105 (FIG. 1) are gleaned 203 by the alias identification component 117 (FIG. 1) and passed 205 to the identification verification engine 121 (FIG. 1). The identification verification engine 121 (FIG. 1) retrieves 207 all previously reported identities 105 (FIG. 1) for this alias 103 (FIG. 1) and compares 209 them to currently received identity 105 (FIG. 1). In this instance, the currently reported identity 105 (FIG. 1) does not match the majority of previously reported identities 105 (FIG. 1) for this alias 103 (FIG. 1), so the identification verification engine 121 (FIG. 1) adjudicates 211 that the currently reported identity 105 (FIG. 1) is false. In response, the identification verification engine 121 (FIG. 1) transmits 213 a notification 125 (FIG. 1) to the parents 107 (FIG. 1) of the child 109 (FIG. 1) from whom the false identity (FIG. 1) originated.

The present specification discusses embodiments of the present invention using the examples of parents 107 governing the IM activities of their children 109. The terms parents 107 and children 109 as used herein are not limited to that specific literal relationship, but can encompass any two parties in which one party is responsible for controlling the electronic communication of the other (e.g., teachers and students, counselors and charges, employers and employees, etc.). Additionally, the electronic communication being governed is not limited to IM activity, but in other embodiments can comprise other formats, such as electronic chatting, e-mailing, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software portions of the present invention can be instantiated (for example as object code or executable images) within the memory of any computing device. As used herein, the terms "client computer" and "server computer" simply mean one or more computers executing the described functionality. Accordingly, the disclosure of the present invention is intended to be illustrative, but not limiting, of the scope of the invention, which is set forth in the following claims.

What is claimed is:

1. A method for verifying electronic communication aliases, the method comprising the steps of:
   receiving, by a server computer, collected identities originating from a plurality of client computers, said identities corresponding to electronic communication aliases used by children associated with originating client computers;
   storing, by a server computer, received identities, corresponding electronic communication aliases, and indications of originating client computers;
   responsive to receiving an identity and a corresponding electronic communication alias, retrieving, by a server computer, previously stored identities corresponding to the same electronic communication alias;
   comparing, by a server computer, the retrieved previously stored identities to the received identity; and
   determining, by a server computer, based upon results of the comparing step, whether the received identity is accurate by increasing a validation score for each retrieved previously stored identity that matches the received identity, decreasing the validation score for each retrieved previously stored identity that does not match the received identity, and comparing the validation score to a threshold value.

2. The method of claim 1 further comprising:
   transmitting, by a server computer, a notification to at least one parent associated with at least one client computer, responsive to determining that a received identity is false.

3. The method of claim 2 wherein transmitting a notification further comprises performing at least one step from a group of steps consisting of:
   executing an event in a parental control application by a server computer;
   sending an email by a server computer;
   sending an instant message by a server computer;
   sending a facsimile by a server computer; and
   generating an automated telephone call by a server computer.

4. The method of claim 2 wherein transmitting a notification to at least one parent associated with at least one client computer further comprises performing a step from a group of steps consisting of:
   transmitting a notification by a server computer to at least one parent associated the client computer from which the received identity determined to be false originated; and
   transmitting a notification by a server computer to at least one parent associated with every client computer from which a retrieved stored identity corresponding to the same electronic communication alias and matching the false identity originated.

5. The method of claim 1 wherein comparing retrieved previously stored identities to the received identity, further comprises:
   normalizing identity content, by a server computer.

6. The method of claim 1 wherein storing received identities and corresponding electronic communication aliases further comprises storing, by a server computer, at least one item from a group of items consisting of:
   a service on which the alias resides;
   a name of an owner of the alias;
   an email address of an owner of the alias;
   a phone number of an owner of the alias; and
   a school attended by an owner of the alias.

7. The method of claim 1 further comprising:
   receiving, by a server computer, a request from a parent to view validation analysis data for at least one electronic communication alias with which an associated child communicates; and
   responsive to the received request, generating, by a server computer, the requested validation analysis data for the parent.

8. The method of claim 1 wherein electronic communication comprises at least one type of electronic communication from a group consisting of:
   instant messaging;
   electronic voice chatting;
   electronic text chatting;
   electronic video chatting; and
   electronic mail.

9. A non-transitory computer readable storage medium containing a computer program product for verifying electronic communication aliases, the computer program product comprising:
   program code for receiving collected identities originating from a plurality of client computers, said identities corresponding to electronic communication aliases used by at least one child associated with an originating client computer;
   program code for storing received identities, corresponding electronic communication aliases, and indications of originating client computers;
   program code for, responsive to receiving an identity and a corresponding electronic communication alias, retrieving previously stored identities corresponding to the same electronic communication alias;
   program code for comparing the retrieved previously stored identities to the received identity; and
   program code for determining based upon results of the comparing step, whether the received identity is accurate by increasing a validation score for each retrieved previously stored identity that matches the received identity, decreasing the validation score for each retrieved previously stored identity that does not match the received identity, and comparing the validation score to a threshold value.

10. The computer program product of claim 9 further comprising:
    program code for transmitting a notification to at least one parent associated with at least one client computer, responsive to determining that a received identity is false.

11. The computer program product of claim 10 wherein the program code for transmitting a notification further comprises program code for performing at least one step from a group of steps consisting of:
    executing an event in a parental control application;
    sending an email;
    sending an instant message;
    sending a facsimile; and
    generating an automated telephone call.

12. The computer program product of claim 10 wherein the program code for transmitting a notification to at least one parent associated with at least one client computer further comprises program code for performing a step from a group of steps consisting of:
    transmitting a notification to at least one parent associated the client computer from which the received identity determined to be false originated; and
    transmitting a notification to at least one parent associated with every client computer from which a retrieved stored identity corresponding to the same electronic communication alias and matching the false identity originated.

13. The computer program product of claim 9 wherein the program code for comparing retrieved previously stored identities to the received identity further comprises:
   program code for normalizing identity content.

14. The computer program product of claim 9 wherein the program code for storing received identities and corresponding electronic communication aliases further comprises program code for storing at least one item from a group of items consisting of:
   a service on which the alias resides;
   a name of an owner of the alias;
   an email address of an owner of the alias;
   a phone number of an owner of the alias; and
   a school attended by an owner of the alias.

15. The computer program product of claim 9 further comprising:
   program code for receiving a request from a parent to view validation analysis data for at least one electronic communication alias with which an associated child communicates; and
   program code for, responsive to the received request, generating the requested validation analysis data for the parent.

16. The computer program product of claim 9 further comprising:
   program code for collecting identities used by children on client computers.

17. The computer program product of claim 16 wherein the program code for collecting identities used by children on client computers further comprises program code for performing at least one step from a group of steps consisting of:
   collecting aliases from at least one child's buddy list;
   monitoring network traffic to and from at least one client computer;
   detecting workflow requests from at least one child asking for parental permission to communicate with a given alias; and
   allowing children to enter information concerning aliases.

18. A computer system for verifying electronic communication aliases, the computer system comprising:
   a computer memory;
   an alias identification component residing in the computer memory, configured to collect identities originating from a plurality of client computers, each of said identities corresponding to an electronic communication aliases used by at least one child associated with an originating client computer;
   an alias identity database residing in the computer memory, configured to store collected identities, corresponding electronic communication aliases, and indications of originating client computers;
   an identification verification engine residing in the computer memory, configured to receive an identity, retrieve previously stored identities corresponding to the same electronic communication alias, compare the retrieved previously stored identities to the received identity, and determine, based upon comparison results, whether the received identity is accurate by increasing a validation score for each retrieved previously stored identity that matches the received identity, decreasing the validation score for each retrieved previously stored identity that does not match the received identity, and comparing the validation score to a threshold value; and
   a notification component residing in the computer memory, configured to transmit a notification to at least one parent responsive to a determination that a received identity is false.

* * * * *